Figure 1:
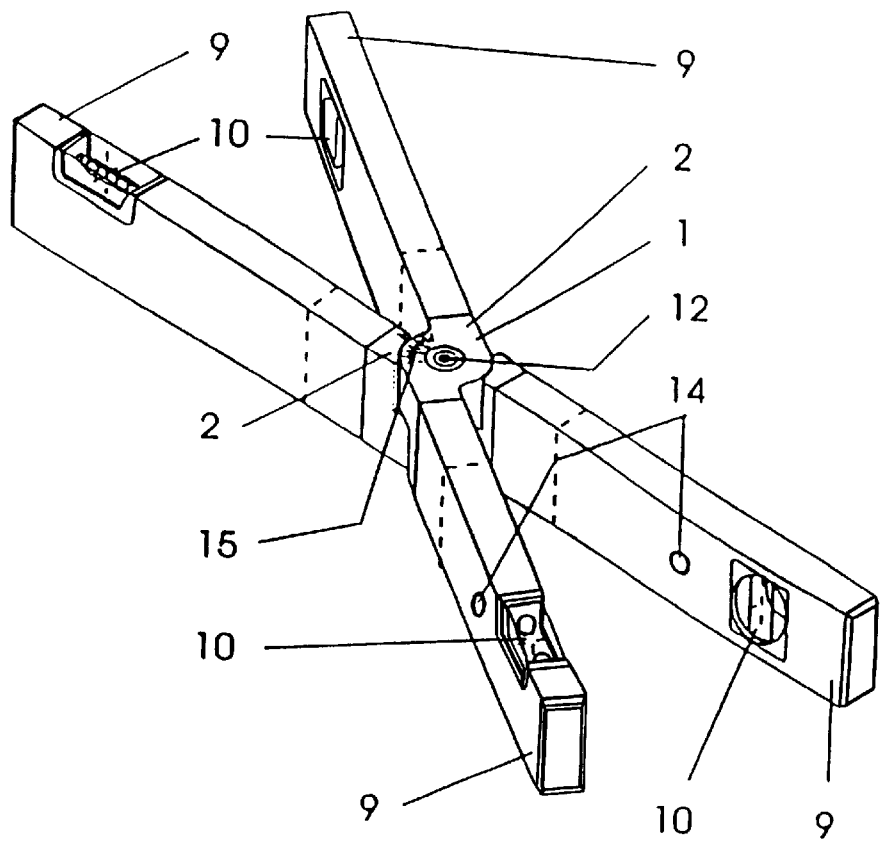

United States Patent
Baumann

Patent Number: 5,881,468
Date of Patent: Mar. 16, 1999

[54] SPIRIT LEVEL

[75] Inventor: Urs Baumann, Morgentalstrasse 46, CH-8355 Aadorf, Switzerland

[73] Assignee: Urs Baumann, Aadorf, Switzerland

[21] Appl. No.: 809,996
[22] PCT Filed: Sep. 18, 1995
[86] PCT No.: PCT/EP95/03693
§ 371 Date: Jun. 9, 1997
§ 102(e) Date: Jun. 9, 1997
[87] PCT Pub. No.: WO96/09521
PCT Pub. Date: Mar. 28, 1996

[30] Foreign Application Priority Data

Sep. 22, 1994 [CH] Switzerland ............................ 2885/94

[51] Int. Cl.⁶ ...................................................... G01C 9/28
[52] U.S. Cl. ............................................... 33/383; 33/451
[58] Field of Search ............................. 33/381, 382, 383, 33/379, 390, 451, 465, 452, 495

[56] References Cited

U.S. PATENT DOCUMENTS

| | | | |
|---|---|---|---|
| 825,217 | 7/1906 | Hull et al. | 33/381 |
| 1,014,402 | 1/1912 | Larsen | 33/383 |
| 1,324,441 | 12/1919 | Rosenholm | 33/381 |
| 1,454,693 | 5/1923 | Schlattau | 33/383 |
| 2,748,494 | 6/1956 | Raney | 33/383 |
| 2,752,692 | 7/1956 | Smith | 33/382 |
| 3,820,249 | 6/1974 | Stone | 33/382 |
| 5,239,761 | 8/1993 | Wu et al. | 33/381 |

FOREIGN PATENT DOCUMENTS 3526081  1/1987  Germany.

*Primary Examiner*—G. Bradley Bennett

[57] ABSTRACT

A spirit level with a pair of elongate arms which are pivotable relative to each other about a pivot axis and which have a measuring device, for being placed on a plane and for detecting an inclination thereof, wherein each of the arms has a first and a second longitudinal portion with a bend portion connecting same, a longitudinal axis of the first longitudinal portion of each arm extended in a direction parallel to a longitudinal axis of the associated second longitudinal portion. The pivot axis extends in the regions of the bend portion of the arms. The first longitudinal portions of the two arms are of a substantially equal first length and the second longitudinal portions of the two arms are of a substantially equal second length.

16 Claims, 8 Drawing Sheets

SPIRIT LEVEL

This invention relates generally to a spirit level and, more specifically, to a dual-armed spirit level for determining two-dimensional inclination with respect to a plane.

Such a spirit level of the general kind set forth is known from DE 35 26 018 A1. Spirit levels have a wide area of use, for example in structural engineering and in mechanical engineering, and serve to check the position of vertical and horizontal components.

A conventional spirit level comprises a wood or metal strip of substantially rectangular cross-section, which is provided with at least one level. Hereinafter the term level is used to denote a slightly curved glass tube (tube level) or a glass capsule with slightly spherical top (circular spirit level) which are filled except for a gas bubble with alcohol, ether or another liquid. When the level is in a horizontal position that gas bubble is disposed precisely at the centre thereof.

Such spirit levels which only comprise one strip can only be used to determine inclination in one direction (that is to say one-dimensionally), whereby problems can be involved in aligning planes or surfaces, for example a table top. In such a case the above-described conventional spirit levels can provide a remedy by virtue of adopting a procedure whereby firstly the inclination of the plane is checked and set in a first direction and thereupon the inclination of the plane is checked and set in a second direction, with the first and second directions generally being perpendicular to each other. However such a procedure is made difficult not least by virtue of the fact that usually adaptation of the inclination of the plane in respect of the first direction inevitably also involves a change in the inclination of the plane in the second direction so that an alignment process becomes a recursive and lengthy procedure which, besides the amount of time involved, achieves a correspondingly low level of accuracy.

Now, spirit levels are known from the state of the art, which permit two-dimensional determination of inclination, that is to say with respect to a plane.

Thus DE 35 26 018 A1 disclosing the general kind of apparatus involved has an elongate main body of rectangular cross-section on which a smaller arm is centrally pivotably arranged. When the arm is in the outwardly pivoted condition it is therefore possible to provide for two-dimensional determination of inclination.

However that spirit level in accordance with the state of the art is not only structurally expensive and disadvantageous—the arm must be designed to be precisely aligned to be received in a suitable recess in the main body and production of the pivot or hinge axis is as a result inevitably complicated or imperfect—but also that known spirit level is disadvantageous in regard to accuracy and further measurement properties: the fact that the pivotable arm is completely received in the associated recess in the main body necessarily means that the spirit level, along the main body, is of a greater length than the arm. As however the degree of measuring accuracy of a spirit level is influenced by the spacing of a level provided at the end of an arm relative to the central point, the spirit level which is known in accordance with the general kind set forth with levels disposed at each of its respective ends and thus arranged at different spacings relative to the axial centre, is inaccurate in regard to its measuring accuracy between the arms and is thus inevitably disadvantageous.

Furthermore the spirit level of the general kind set forth evidently permits it to be put only on to a continuous plane for the fact that the recess for the arm, which is formed almost entirely along the underside of the main body, means that the spirit level must be put on to the subjacent plane or surface, at both end portions of the main body, in order to be able to perform any measurement procedure at all. If however for example the situation involves ascertaining the slope of a plane or a surface which in terms of its dimensions is smaller than the spacing of the end portions of the main body, the spirit level of the general kind set forth is unsuitable for such use.

FR 2 613 475 also discloses a spirit level which is formed from a star-like arrangement of three angle members which are arranged relative to each other rigidly at an angle of 120°. Besides the increased expenditure from the point of view of construction and manufacture, which the production of such an apparatus involves, a spirit level of that kind is already disadvantageous for the simple reason that it can only be accommodated with difficulty in terms of the amount of space occupied and in particular does not readily fit into a tool box or the like. Accordingly mobile and flexible use on site is made markedly more difficult with such an item of equipment.

Therefore the object of the present invention is to provide a spirit level which enjoys enlarged and more flexible possible uses and which in addition is simple to manufacture while being suitable for mass production and which takes up only a small amount of space.

The object of the present invention is achieved using an arrangement for a spirit level in which the arms are pivotable relative to each other in the region of the respective bend portion and each have a first and a second longitudinal portion connected by the rigid bend portion permit the spirit level to be collapsed in a simple manner which saves space. By virtue of the substantially equal lengthwise dimension of the respective longitudinal portions of the arms, the arms afford the prerequisite for two-dimensional measurement which is of equal accuracy in each direction in the outwardly pivoted condition. At the same time the arrangement ensures that both in the collapsed condition and also with any angle of pivotal interrelationship between the arms, there is always a continuous contact with a subjacent surface so that the spirit level according to the invention is suitable for measuring any planes—continuous plates or panels, troughs or edges etc—of any dimensions.

Advantageous developments of the invention are described in the appendant claims.

In the present invention, the configuration of the first and second lengths results in complete symmetry which—for example for the production of a high-precision measurement instrument—permits the provision of a level at each end of an arm and thus in each measurement direction can carry two measurement devices which are respectively spaced at a constant spacing. In a particularly preferred feature the width of the longitudinal portions of each arm corresponds to the displacement afforded by the bend portion (that is to say the spacing of the longitudinal axis of the first longitudinal portion with respect to the longitudinal axis of the associated second longitudinal portion in a plane) thereby affording the prerequisite that both arms can be fitted one into the other for pivotal movement thereof and the entire arrangement, in the condition of being folded or pivoted together, is only of a total width which corresponds to two arms in a condition of bearing against each other. In that way it is possible to produce a spirit level which requires a minimum amount of space.

In a particularly suitable configuration each arm is provided in the region of the bend portion with a recess which is of such a dimension that the bend portion of the respective other arm fits into same.

In a particularly advantageous feature from the production procedure point of view, both arms are of the same external shape so that they can be produced—in a particularly preferable feature additionally in an integral configuration—by means for example of an injection moulding procedure by means of the same injection moulding tool. Although the spirit level according to the invention is a precision tool, it is therefore possible in that way to provide for comparatively inexpensive manufacture.

In accordance with a further preferred development of the invention at least one of the arms is adapted to be divisible along its longitudinal direction to receive an extension portion or the like and/or at its end has a device with which the arm can be additionally extended, for example by a conventional spirit level. A possible area of use for such a development would involve measuring or adjusting a frame or a peripherally extending edge, the dimensions of which are larger than those of the spirit level in the non-extended condition. By inserting or attaching suitable extensions however it is then possible to bridge over a correspondingly large internal space of a frame or a tub or tank.

While the spirit level according to the invention—as in the conventional case—can be of a solid configuration or can be in the form of a hollow profile of substantially rectangular cross-section, it has been found particularly advantageous for at least the longitudinal portions of the arms to be produced by a single U-shaped profile or a double T-shaped profile. Such a profile configuration is in that respect not only advantageous in terms of simple and inexpensive manufacture, but it also permits the arms to be produced with a substantially torsionally stiff structure in a configuration which is true to shape and is therefore accordingly particularly suitable for an accurate and reliable measuring apparatus like the spirit level according to the invention.

In accordance with a particularly preferred development the arms which are pivotable relative to each other can be latched or locked relative to each other at predetermined spacings—for example 45° or 90°—so that in practical use accidental displacement thereof can be prevented. In a particularly preferred feature moreover the spirit level according to the invention is provided in the region of the pivot axis between the arms to be pivoted with a circular spirit level and/or a scale as a measuring device for a set angle between the arms.

Depending on the specific area of use involved, the spirit level according to the invention can be provided as required with levels for horizontal or vertical measurement, which can preferably be fitted into suitable recesses in the arms. In a particularly suitable construction the arms can additionally be provided with a height measuring device and/or a length measuring device, for example a length scale which is printed thereon. The various advantageous configurations of the arms with outside surfaces of large area additionally advantageously permit the spirit level according to the invention to be provided with company identifications, advertising printing thereon, operating instructions or the like.

It will be appreciated that instead of the known tube-type or circular levels, it is also possible to use electronic position sensors, for example with a digital display.

Figure 2:
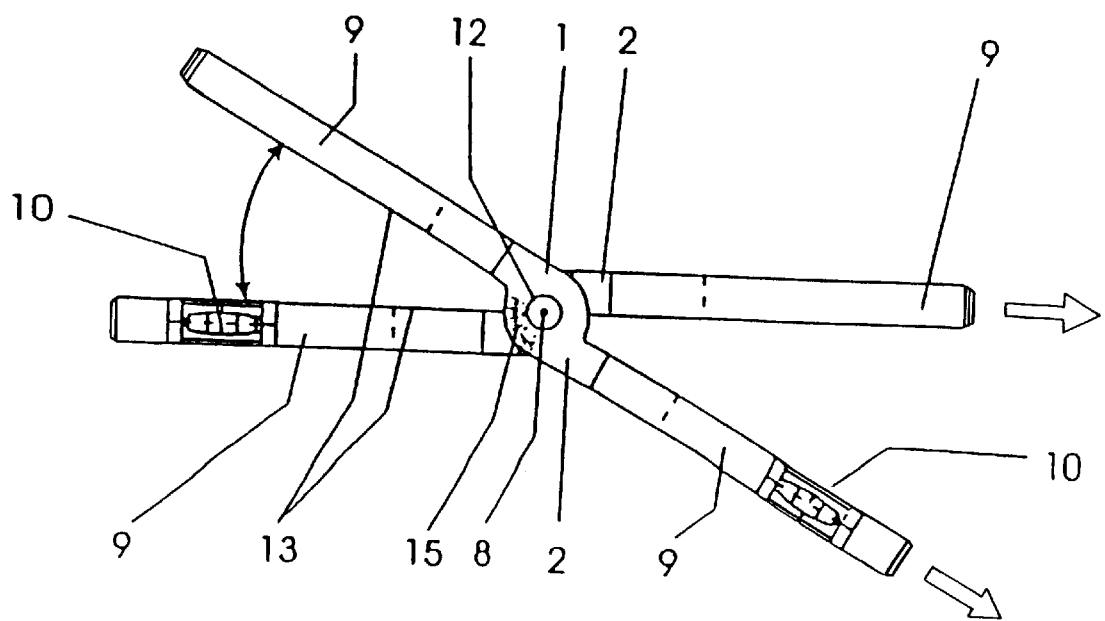
Figure 3:
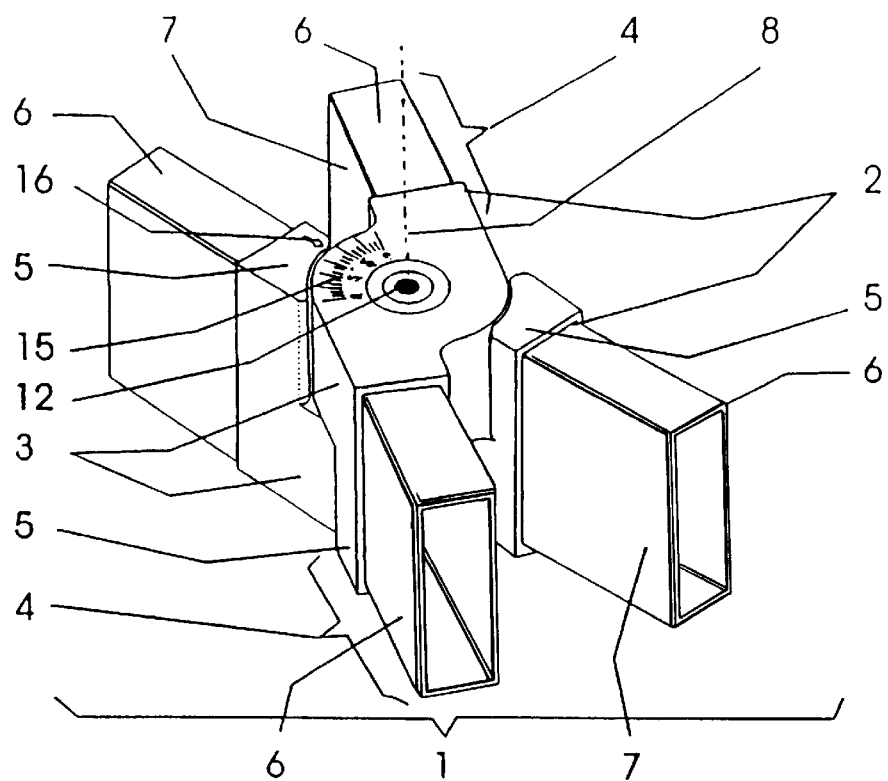
Figure 4:
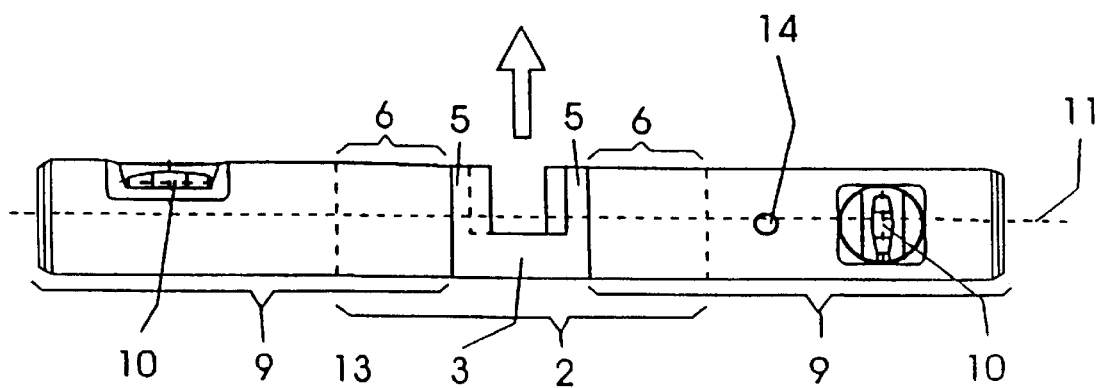
Figure 5:
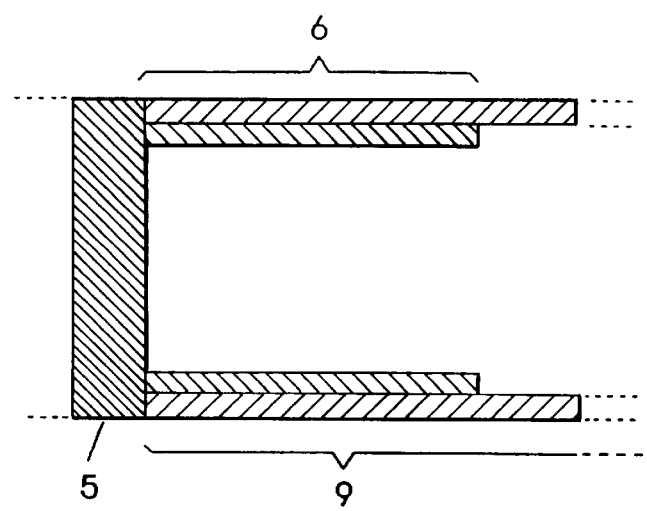
Figure 6:
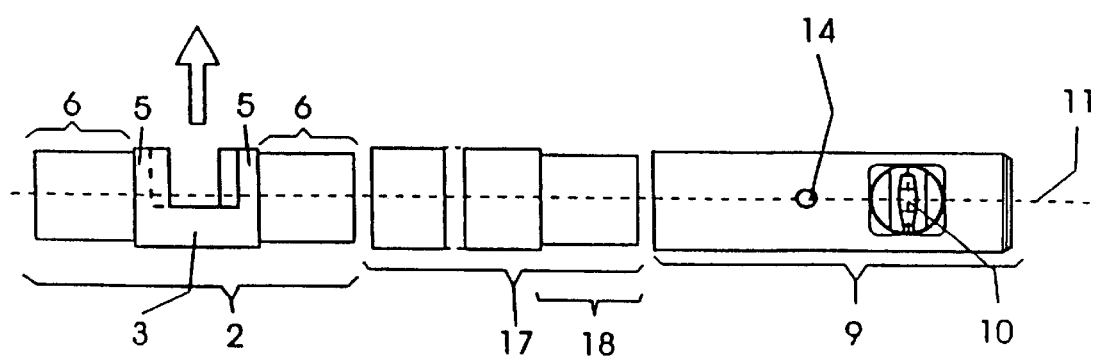
Figure 7A:
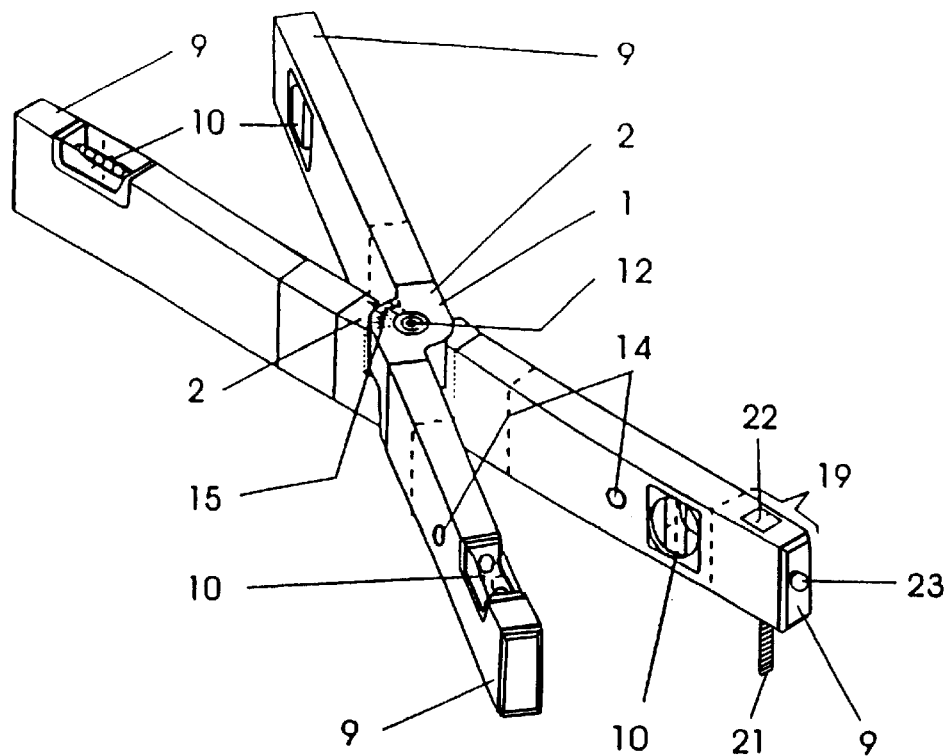
Figure 7B:
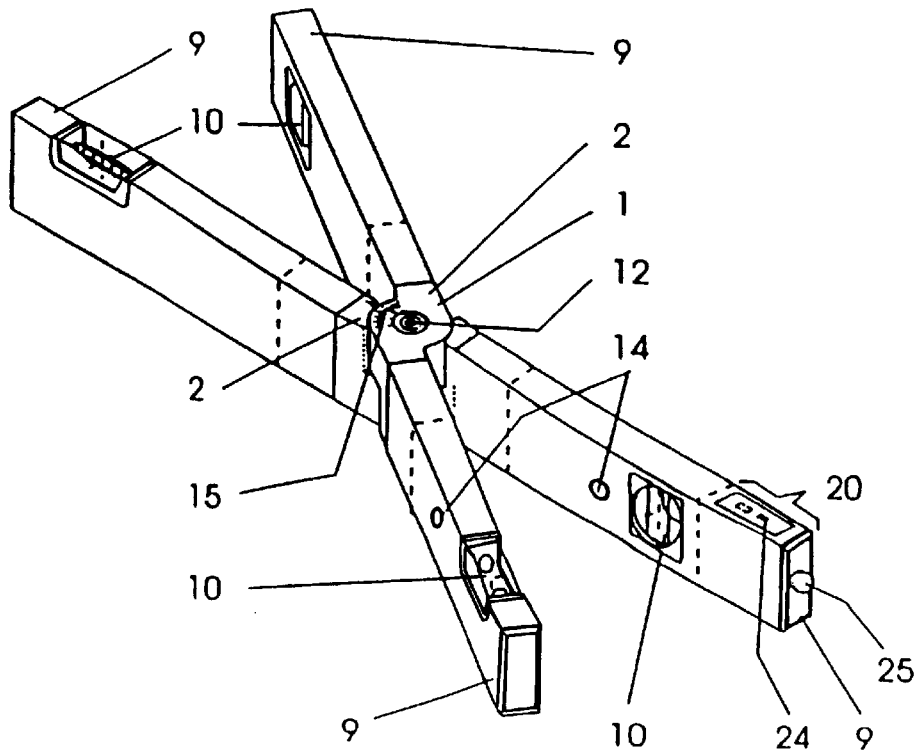
Figure 8:
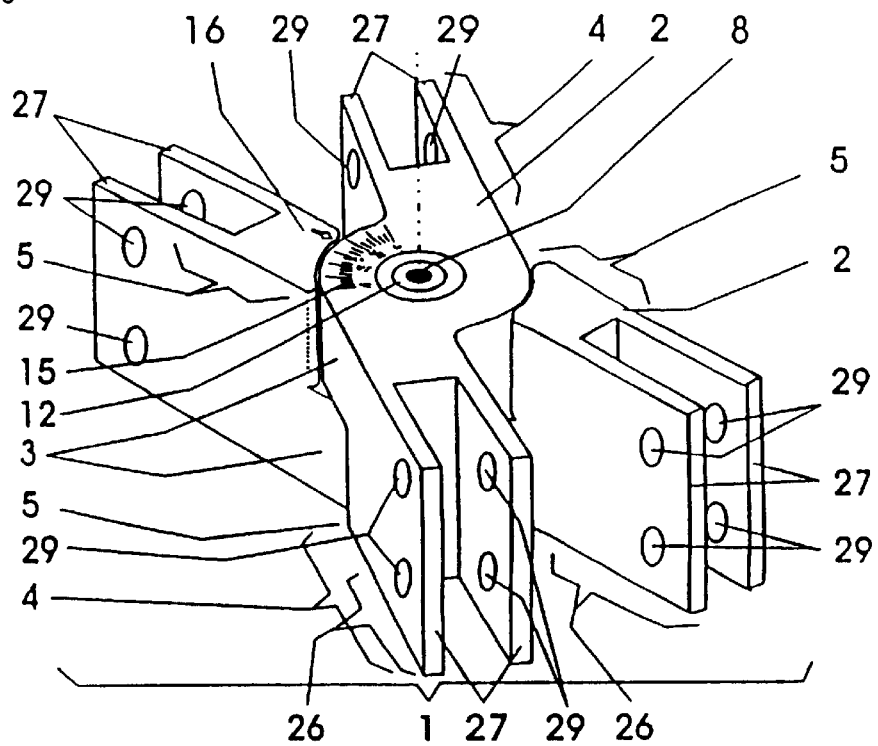
Figure 9:
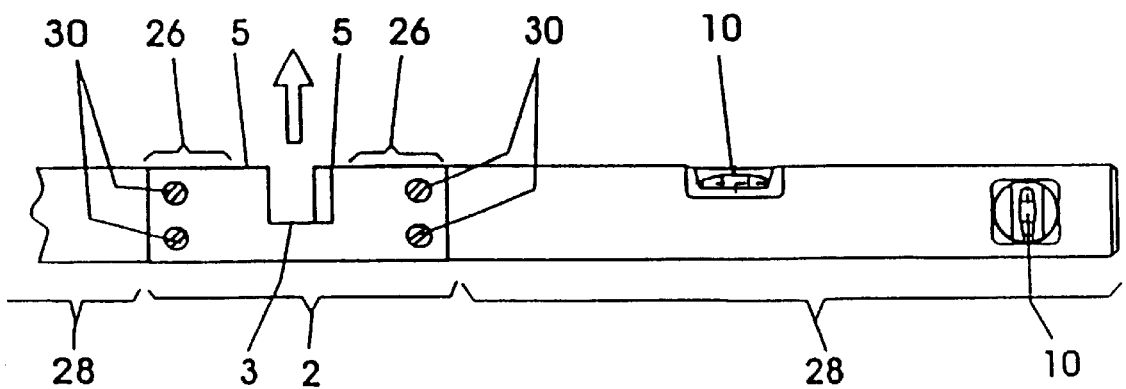
Figure 10:
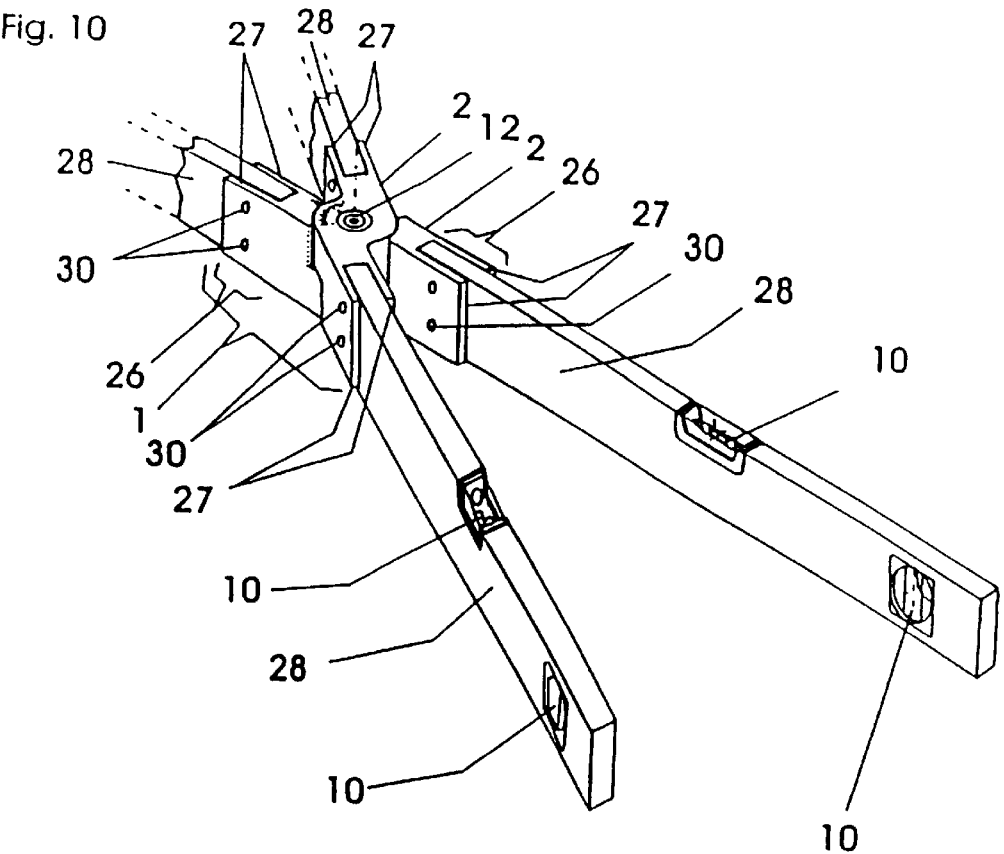
Figure 11:
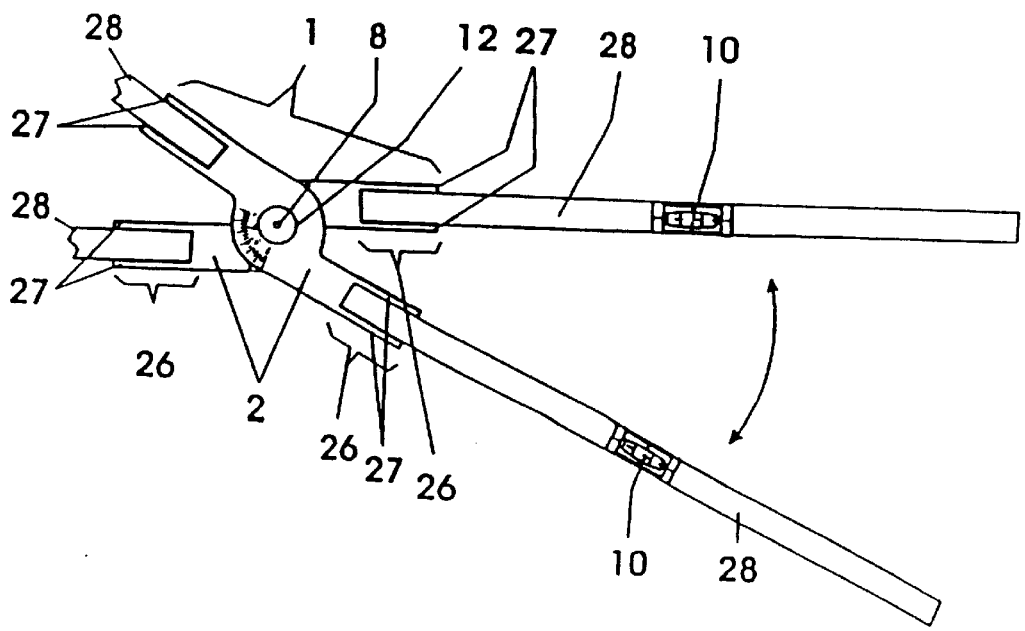
Figure 12:
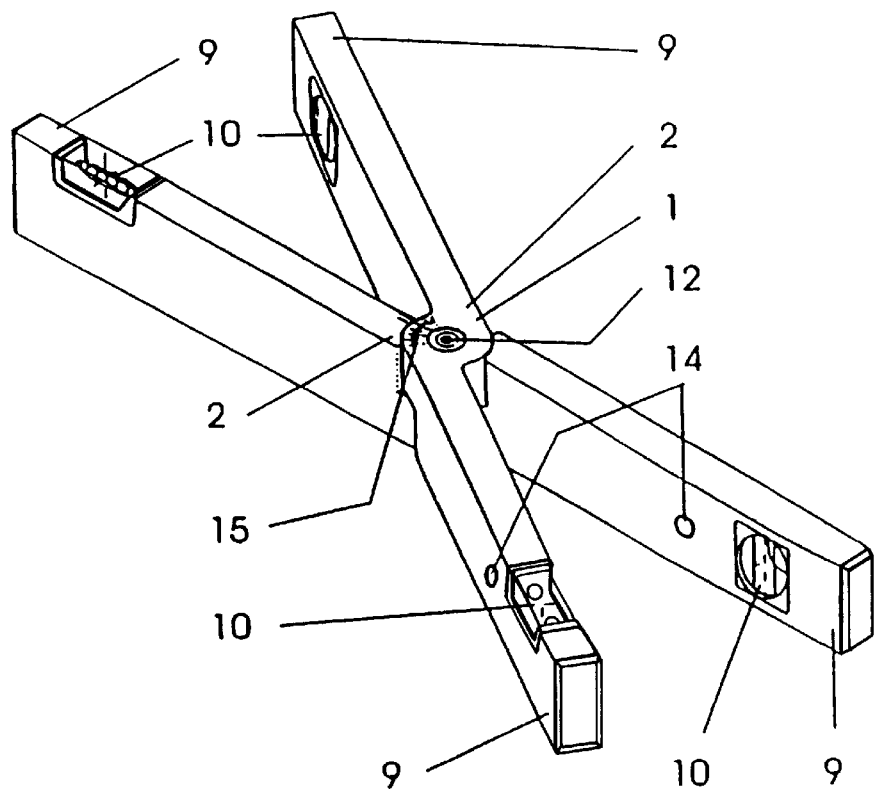
Figure 13:
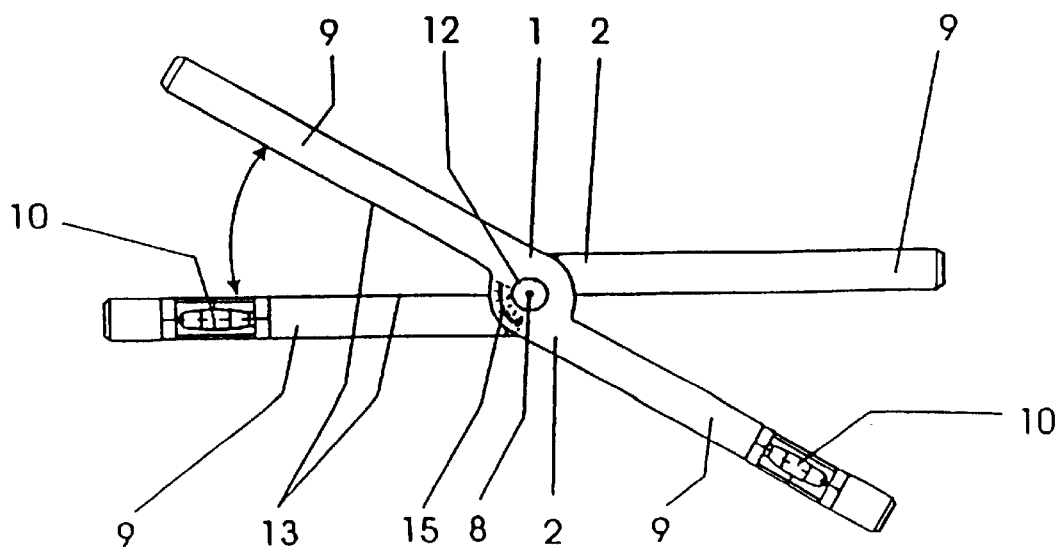
Figure 14:
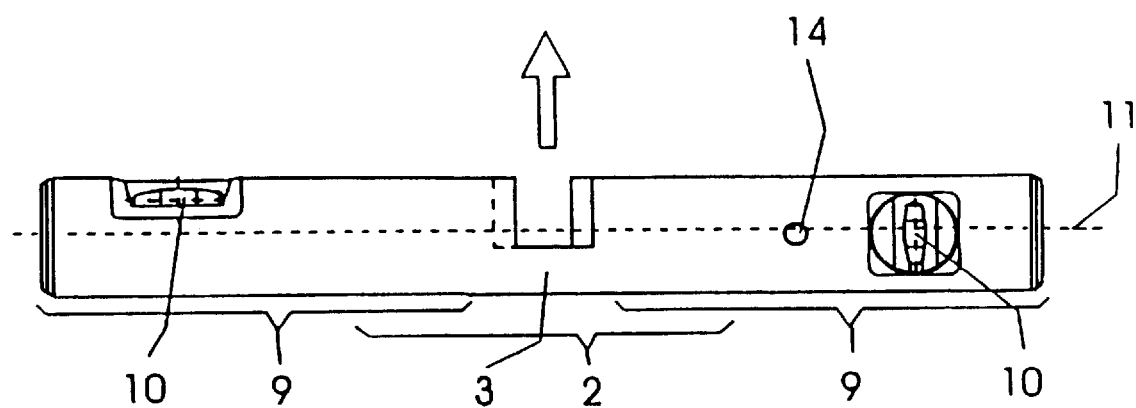

Further advantages, features and details of the invention will be apparent from the following description of preferred embodiments and with reference to the drawing in which:

FIG. 1 is a perspective view of the spirit level in accordance with a first embodiment, FIG. 2 is a plan view of the spirit level shown in FIG. 1, FIG. 3 is a perspective view of the hinge portion of the spirit level shown in FIG. 1, FIG. 4 is a side view of a limb of the hinge portion of a spirit level as shown in FIG. 1 with two arms fitted thereon, FIG. 5 is a view in longitudinal section through an end portion of an arm which is fitted on to a limb of the hinge portion shown in FIG. 3, FIG. 6 is an exploded view of an arm of a spirit level of the first embodiment with an extension portion, FIG. 7a is a perspective view of a spirit level in accordance with the first embodiment, which is provided with a roll-up retractable tape measure, FIG. 7b is a perspective view of a spirit level in accordance with the first embodiment, which is provided with an electronic distance measuring device, FIG. 8 is a perspective view of a hinge portion of a spirit level in accordance with a second embodiment, FIG. 9 is a side view of a limb of a hinge portion of a spirit level in accordance with the second embodiment, to which two conventional spirit levels are fixed, FIG. 10 is a perspective view of a spirit level in accordance with the second embodiment, FIG. 11 is a plan view of a spirit level as shown in FIG. 10, FIG. 12 is a perspective view of a spirit level in accordance with the third embodiment, FIG. 13 is a plan view of a spirit level as shown in FIG. 12, and FIG. 14 is a side view of a limb of a spirit level as shown in FIG. 13.

The central hinge portion 1 of the spirit level is composed of two mutually crossing limbs 2 (see FIG. 3). Each of those limbs 2 is subdivided into a central hinge part 3 of approximately circular shape in plan and two outer connecting parts 4. The two connecting parts 4 of a limb 2 extend parallel to each other. They are laterally displaced relative to each other by the width of a connecting part 4. The inside surfaces 7 of the two connecting parts 4 of a limb 2 lie on a common plane which extends through the hinge axis 8 (see FIGS. 2, 11 and 13). At least one of the two limbs 2 carries at the outer end of its hinge part 3 a circular spirit level which permits checking of the slope of a plane in all directions (see FIGS. 3 and 8).

The limbs 2 of the hinge portion 1 are preferably made from aluminium or plastic material.

For the purposes of measuring angles with respect to the vertical or horizontal, disposed on the outer end of at least one of the limbs 2 of the hinge portion 1 is a measuring scale 15 with angle graduations (see FIG. 3). The measuring scale 15 extends over at least 90°. The connecting part 4 which directly adjoins the measuring scale 15 is provided with a marking 16 which points to the respectively applicable measurement value of the scale 15.

In the case of the spirit level of the first embodiment each connecting part 4 is in turn subdivided into a guide part 5 which is towards the hinge part 3 and a fitment part 8 which is remote from the hinge part 3 (see FIG. 3). The guide part 5 is of an approximately trapezoidal configuration in plan and is of a rectangular side elevation. The fitment parts 6 are in the form of hollow profiles of rectangular configuration in plan and with a rectangular side elevation.

Each arm 9 of a spirit level of the first embodiment is formed by a hollow profile of rectangular cross-section. The hollow profile, may comprise aluminium or plastic material. A respective one of the four arms 9 is fitted on to each fitment part 6 of the limbs 2 (see FIG. 4). That is made possible by virtue of the fact that the internal cross-section of the hollow profile of an arm 9 corresponds to the external cross-section of the fitment part 6 of the limbs 2. The hollow profile of an arm 9 can therefore completely accommodate in its interior a fitment part 6 of a limb 2 (see FIG. 5). The arms 9 can be additionally fixed to the fitment parts 6 by at least one screw (not shown).

The outer end of the arms 9 is closed. Two of the four arms 9 have in their outer end portion at the top side thereof a recess of rectangular side elevation. Each of those recesses accommodates a tube level whose tube extends parallel to the longitudinal axis 11 of the corresponding arm 9. The tube levels 10 serve to check a horizontal plane. The horizontal measuring levels are preferably mounted on two arms 9 which are fixed to different limbs 2 (see FIGS. 1 and 2).

The two arms 9 without horizontal measuring levels have in each of their outer end portions a continuous recess which extends at a right angle to the side surfaces 13 of the corresponding arm 9 and which is preferably of a square side elevation. Arranged in each of those recesses there is also a respective tube level 10 whose tube extends however at a right angle to the longitudinal axis 11 of the arm 9 (see FIGS. 1 and 4). Those tube levels 10 serve to check vertical planes.

So that the spirit level can be hung up, two adjacent arms 9 are each provided with a respective through bore 14 which extends at a right angle to the side surfaces 13 of the arms 9 (see FIGS. 1 and 4). The bores 14 are disposed at mutually corresponding positions on the two arms 9 so that they are aligned with each other when the arms 9 bear against each other with their side surfaces 13.

In a preferred embodiment the height of the spirit level is 50 mm and its width is 40 mm when it is in the condition of being collapsed. There are provided various lengths which can be in the range of 200 to 2000 mm.

By virtue of the push-on connection between the central hinge portion 1 and the arms 9, the various lengths can be afforded by the use of arms 9 of different lengths. The hinge portion 1 preferably remains unchanged.

There is also the possibility of providing the different lengths by means of extension portions 17 (see FIG. 6). Those extension portions 17 are inserted between the arms 9 and the hinge portion 1. An extension portion 17 is divided into a main body and a fitment part 18. The main body comprises a hollow profile which is of the same cross-section and the same wall thickness as the hollow profile of the arms 9. The fitment part 18 also comprises a hollow profile which however is of the same cross-section and the same wall thickness as the hollow profile of the fitment parts 18 on the hinge portion 1. Each extension portion 17 is fitted with its main body on to a fitment part 18 of the hinge portion 1. The fitment part 18 of each extension portion 17 is fitted into an arm 9.

A distance measuring device 19, 20 can be disposed in the outer end portion of at least one arm 9 (see FIGS. 7a and 7b).

This may involve a mechanical distance measuring device 19 or an electronic distance measuring device 20. FIG. 7a shows a spirit level with a mechanical distance measuring device 19 in the form of a roll-up retractable tape measure 21. In the retracted condition the tape measure 21 is disposed, except for a short end portion thereof, in the interior of the arm 9. It can be pulled out through an opening at a narrow side of the arm 9. A spring is stressed when the tape measure is pulled out. When the tape measure 21 is no longer needed, the spring force is used to roll up the tape measure 21 again in the interior of the arm 9. The rolling-up procedure can be started by means of a release button 23.

The distance defined by the length of the portion of tape measure which is pulled out is indicated in a viewing window 22 arranged at that narrow side which is disposed opposite the exit opening for the tape measure 21.

The mechanical distance measuring device can also be in the form of a simple roll-up tape measure without viewing window and release button.

The electronic distance measuring device 20 can operate for example with light, ultrasound or micro-waves. Those waves serve as a carrier for measuring signals which are modulated thereon. After reflection at the target point, the distance is calculated from the signal transit time and the speed of propagation. Such apparatuses are known from the measuring art.

The distance measuring device 20 is disposed entirely in the interior of an arm 9. The measuring operation can be triggered off with an operating knob or button 25 arranged for example at the outer end of the corresponding arm 9. The measuring result is indicated by a display device 24 which is disposed for example on a narrow side of the arm 9. The opening for the emitted or reflected waves respectively to pass through is disposed at the opposite narrow side. Batteries which are also disposed in the interior of the arm 9 can serve as the power source for the distance measuring device 20.

In the case of the spirit level of the second embodiment each connecting part 4 is divided into a guide part 5 which is towards the hinge part 3 and a fixing device 26 which is remote from the hinge part 3 (see FIGS. 8 and 11). The guide part 5 is of the same configuration as in the case of the spirit level of the first embodiment. A conventional bar-like spirit level 28 can be fixed to each connecting part 4 by means of the fixing device 26, in such a way that an end of the conventional spirit level 28 is towards the outer end of the connecting part 4 and the central longitudinal axes of the conventional spirit level 28 and the connecting part 4 are disposed on each other. The fixing device 26 can be for example in the form of two fixing plates 27 which project at a right angle from the end of the guide part 5 (see FIG. 8). The outer side surface of each fixing plate 27 is flush with one of the two side surfaces of the guide part 5 and the two fixing plates 27 are at a certain spacing from each other. The end part of a conventional spirit level 28 is inserted from the outer end into the intermediate space between the two fixing plates 27 (see FIGS. 10 and 11). Each fixing plate 27 is provided with two round bores 29. The bores 29 of the two fixing plates 27 of a fixing device 26 are aligned with each other in pairs. The end part of the conventional spirit level 28 is provided also with two transverse bores (not shown) passing therethrough. When the end part is inserted each of those bores is aligned with a respective bore 29 in each of the two fixing plates 27. The conventional spirit level 28 is now fixed to the fixing device 26 by a screw 30, a bolt or a cotter or split pin being passed transversely through the respectively mutually aligned bores in the fixing plates 27 and the spirit level end part (see FIGS. 9 to 11).

Finally there is also provided a third embodiment which differs from the first embodiment in that, in a simplifying construction, the arms 9 are not fixed by means of push-on fitment connections to the limbs 2 of the hinge portion 1, but form therewith an interconnected unit. Each two parallel arms 9 are therefore made in one piece together with the limbs 2 of the hinge portion 1, which are disposed therebetween (see FIGS. 12 to 14). This embodiment is considered as the mode of carrying the invention into effect.

In addition the spirit level of the third embodiment may also be provided with mechanical or electronic distance measuring devices 19, 20 (not shown).

Both in the case of the spirit level of the first embodiment and the spirit level of the third embodiment, there is the possibility of using electronic position sensors with digital display (not shown), instead of the tube levels and circular spirit levels.

In accordance with an alternative configuration of the above-described embodiment it is possible for the arms of the spirit level to be of a U-shaped or double-T-shaped profile in cross-section. Such a configuration—particularly if aluminium is used in a die casting process—simplifies production and permits the surfaces to be of a precise and dimensionally true nature. That configuration for the arms in the form of U-shaped or double-T-shaped profiles is not illustrated in the figures.

In accordance with a further preferred development of the invention all three embodiments as described above may be provided in the hinge portion 1 with a retaining or latching means (not shown) which, at predetermined angular spacings, for example 30°, 45° or 90°, permits the arms which are pivoted relative to each other to be arrested or latched at that predetermined angle and thus prevents unintended displacement of the arms in use of the spirit level.

In accordance with still a further preferred development the mounting arrangement in the hinge portion 1 is afforded by means of an axial needle bearing which is parallel to the hinge axis. That makes it possible to provide for particularly precise mounting of the arms to each other. In addition the hinge portion can preferably be made water-tight by means of a silicone ring or the like so that the spirit level according to the invention can also be used in a damp environment without the risk of corrosion.

The proposed spirit level according to the invention is employed or used in the following manner:

To check a plane, the arms 9 of the spirit level are pivoted outwardly from each other. The ideal angle of opening depends in that respect on the size of the plane to be checked.

Thereafter the spirit level is put on to the horizontal or vertical plane to be checked. The plane can now be simultaneously adjusted in two directions by means of the two horizontal and vertical measuring levels respectively.

If at the same time the distance of the plane to be checked in relation to a second plane or a fixed point is also to be ascertained, then the spirit level is applied to the plane to be checked, in such a way that that arm end part which includes the distance measuring device 19, 20 projects beyond the edge of the plane. Distance measurement can now be effected by pulling out the tape measure 21 or by triggering off the electronic measuring procedure.

Moreover the spirit level can be used for aligning a rectangular plate or panel simultaneously in the vertical and also in the horizontal. For that purpose the spirit level is opened at an angle of 90°. One of the arms 9 with a horizontal measuring level is then applied to the upper horizontal narrow side of the plate or panel and one of the arms 9 with a vertical measuring level is applied to a vertical narrow side. The narrow sides can now be adjusted simultaneously horizontally and vertically respectively by means of the spirit level.

It is also possible to use the spirit level to measure angles of up to 90° or complementary angles of up to 180°. It is thus also possible to adjust planes which are inclined with respect to the vertical and horizontal at a desired angle of inclination. By virtue of the angle measuring device, the proposed spirit level can also be used for measuring angles.

Correct adjustment of the spirit level can be easily checked by the spirit level being put on to a plane which is known to be horizontal or vertical and then checked to ascertain whether the bubbles in the horizontal and vertical measuring levels respectively are at the centre of the tube or spherical container.

The proposed spirit level has the following advantages over the known spirit levels:

It is of a simple but nonetheless sturdy construction. It permits checking of the inclination both of horizontal and also vertical planes in two directions. The proposed spirit level can also be used for simultaneously vertically and horizontally aligning rectangular plates or panels such as for example cladding panels or panels for external insulation of buildings. It also permits measurement of angles and adjustment of planes which are inclined relative to the vertical or the horizontal respectively. In addition, it can be used to check not only the position of a plane with respect to the vertical or horizontal but also the spacing thereof from a reference plane or a reference point.

That plurality of functions is not afforded by any of the known spirit levels.

The particular advantage of the first embodiment lies in the subdivision of the spirit level into a central hinge portion 1 and four arms 9 which are fixed to each other by means of a push-in fitment connection. That affords the possibility of varying the overall length of the spirit level by fitting arms 9 of different lengths on to the hinge portion 1. Long arms 9 may be necessary for example when a frame or another plane which is not continuous has to be adjusted. The arms 9 then bridge over the open portions thereof. A large number of conventional bar-like spirit levels 28 is already in use. The proposed spirit level of the second embodiment has the particular advantage that it permits the further use of conventional spirit levels 28.

Finally the particular advantage of the spirit level of the third embodiment lies in its simple construction. Its manufacturing costs are also correspondingly low.

I claim:

1. A spirit level comprising a pair of elongate arms which are pivotable relative to each other about a pivot axis and which have a measuring device, for putting on to a plane and for detecting an inclination thereof, wherein each of the arms has a first and a second longitudinal portion with a rigid bend portion connecting them, a longitudinal axis of the first longitudinal portion of each arm is extended at a spacing parallel and in a plane from a longitudinal axis of the associated second longitudinal portion, the pivot axis extends in the regions of the rigid bend portions of both arms, the first longitudinal portions of both arms are of a substantially equal first length and the second longitudinal portions of both arms are of a substantially equal second length, and the arms are of such a configuration as to ensure that continous contact with the plane always prevails both in a collapsed condition and also with any pivot angle between the arms.

2. A spirit level according to claim 1 of wherein the first length is substantially equal to the second length.

3. A spirit level according to claim 1 wherein the first and the second longitudinal portion of both arms is of a substantially equal width with respect to the plane and the spacing of the longitudinal axes corresponds to said width.

4. A spirit level according to claim 1, wherein in the region of the bend portions the arms each have a respective recess which is provided in a direction that is vertical with respect to the plane and which is of such a configuration that the arms can be fitted one into the other, wherein the recess of an arm receives the bend portion of the respective other arm.

5. A spirit level according to claim 4 wherein the pivot axis is afforded by an axis element and forms a central hinge which connects both arms in the condition of being fitted one into the other, extending through a central point in the respective bend portion.

6. A spirit level according to claim 1, wherein both arms are of the same external shape.

7. A spirit level according to claim 1 wherein, for each of the arms first longitudinal portion, the bend portion and the second longitudinal portion are of an integral construction.

8. A spirit level according to claim 1 wherein at least one of the arm is adapted to be divisible along its longitudinal direction and an extension portion can be fitted into such a division.

9. A spirit level according to claim 1 wherein at least one arm has at its end a device for fixing a conventional spirit level which extends the respective longitudinal portion of the arm.

10. A spirit level according to claim 1 wherein, in cross-section, the arms are each in the form of a U-shaped profile in the region of the first and second longitudinal portions and are produced by a die casting process.

11. A spirit level according to claim 1 wherein at predetermined locations the arms are provided with horizontal recesses which are adapted for the insertion of level elements.

12. A spirit level according to claim 1 wherein an angle measuring device which is formed around the pivot axis and which can be read off in the condition of being put on a plane, for detecting an angle between the arms which are pivoted relative to each other in the plane.

13. A spirit level according to claim 1 wherein a means is provided in the region of the pivot axis for latchingly arresting the arms which are pivoted relative to each other, at least at one predetermined angle.

14. A spirit level according to claim 1 wherein a circular spirit level is disposed in the region of the pivot axis.

15. A spirit level according to claim 1 wherein at predetermined locations the arms are provided with vertical recesses which are adapted for the insertion of level elements.

16. A spirit level according to claim 1 wherein, in cross-section, the arms are each in the form of a double T-shaped profile in the region of the first and second longitudinal portions and are produced by a die casting process.

* * * * *

UNITED STATES PATENT AND TRADEMARK OFFICE
CERTIFICATE OF CORRECTION

PATENT NO. : 5,881,468
DATED : March 16, 1999
INVENTOR(S) : Baumann

It is certified that error appears in the above-indentified patent and that said Letters Patent is hereby corrected as shown below:

Column 9, line 14, In claim 7, line 2, after "arms" insert

-- of the --.

Signed and Sealed this

Third Day of August, 1999

Attest:

Q. TODD DICKINSON

*Attesting Officer*     *Acting Commissioner of Patents and Trademarks*